US010605297B2

(12) United States Patent
Schoot Uiterkamp et al.

(10) Patent No.: US 10,605,297 B2
(45) Date of Patent: Mar. 31, 2020

(54) WASHER FIXATION METHOD AND SYSTEM

(71) Applicant: Sensata Technologies, Inc., Attleboro, MA (US)

(72) Inventors: Ernie Schoot Uiterkamp, Heeten (NL); Jan Bos, Emmen (NL)

(73) Assignee: Sensata Technologies, Inc., Attleboro, MA (US)

( * ) Notice: Subject to any disclaimer, the term of this patent is extended or adjusted under 35 U.S.C. 154(b) by 153 days.

(21) Appl. No.: 15/608,816

(22) Filed: May 30, 2017

(65) Prior Publication Data

US 2018/0347617 A1 Dec. 6, 2018

(51) Int. Cl.
*F16B 43/00* (2006.01)
*G01L 23/26* (2006.01)
*F16B 4/00* (2006.01)

(52) U.S. Cl.
CPC ............ *F16B 43/001* (2013.01); *F16B 4/004* (2013.01); *G01L 23/26* (2013.01)

(58) Field of Classification Search
CPC ......... F16B 43/001; F16B 4/004; F16J 15/08; F16J 15/0887; F16J 15/0893; G01L 23/26; B23P 19/02; B23P 19/08; B23P 19/082; B23P 19/10; B23P 19/12; B23P 19/084
USPC .......................................................... 29/451
See application file for complete search history.

(56) References Cited

U.S. PATENT DOCUMENTS 6,070,883 A * 6/2000 Marto .................... G01L 23/26
                                                    277/609
6,957,939 B2 * 10/2005 Wilson ................... F16B 37/14
                                                    411/37

FOREIGN PATENT DOCUMENTS

CN     105043658 A    11/2015
EP       3062079 A1    8/2016

OTHER PUBLICATIONS

Combined Search and Examination Report from related UK Application No. 1806816.3 dated Oct. 17, 2017.

* cited by examiner

*Primary Examiner* — Christopher J Besler
*Assistant Examiner* — Christine Bersabal
(74) *Attorney, Agent, or Firm* — Burns & Levinson LLP; Joseph M. Maraia; Daniel J. McGrath

(57) ABSTRACT

Assembly systems and methods are provided for elastically deforming a non-circularly shaped washer while driving the washer through an insertion tool into a workpiece, such as a pressure sensor, having a correspondingly shaped recess with an inner wall diameter less than a maximum radial dimension of the non-circular washer. The washer is released from radial compression into the recess so as to permit the washer to become fixated against the inner wall of the recess by a retention force. The fixated washer has a height greater than a height of the recess inner wall, and may serve as a deformable sealing element between the workpiece and other components.

8 Claims, 6 Drawing Sheets

WASHER FIXATION METHOD AND SYSTEM

BACKGROUND

1. Technical Field

The present disclosure relates generally to the assembly of a metal part to a workpiece comprising a different hardness material, and more specifically to tools and methods of manufacture for high fluid pressure sealing structures.

2. Discussion of Related Art

Next generation fuel systems 100, such as shown in part in FIG. 1A, utilize higher fuel pressures (e.g., 2100 to 2700 bar) in their fuel rails 102 in order to meet emissions regulations. Highly pressurized fluid systems are demanding on seals between joined members. To accommodate these higher pressures, material properties such as hardness of the fuel rails 102 are changing. A high pressure sensor 104, such as shown in an exploded view in FIG. 1B configured with a male connector sensor port 106 having a generally cylindrical body and external threads, is typically threadably connected to the female end 108 of the fuel rail 102. Conventionally, a seal between pressure sensor port 106 and fuel rail end 108 is made metal-to-metal, with the fuel rail 108 deforming such that a leak-tight seal is created. Due to the increasing hardness of fuel rails 102, deformation of the fuel rail end 108 and the associated sealing between the pressure sensor port 106 and fuel rail 102 is no longer guaranteed. Elastomeric or polymer seals are unsuitable for such applications, due to their permeability and insufficient material strength properties. Soft metal gaskets with deforming wedge shaped sealing edges are typically costly, require special support frames comprised of plates of sheets of metal with bolt holes that provide the positioning for the wedge type seal relative to the bolts, and their use is restricted to sealing flat flange faces and do not fit into grooves such as an O-ring groove that might be formed in the ports 106 of pressure sensors 104.

Thus, what is needed is a reliable sealing structure for high pressure connections, such as between fuel sensors and higher material hardness fuel rails.

SUMMARY

The embodiments described herein provide assembly processes and apparatus for fixating a metal washer to a workpiece in order to form a reliable, high pressure sealing structure. By placing a portion of the metal washer between a pocketed port of the workpiece (e.g., a fuel pressure sensor, etc.) and high hardness mechanical element, such as a fuel rail, to which the pressure sensor is to be joined, a robust seal can be established. The methods and equipment described permit an integrated seal via fixation of the washer to the pressure sensor without plastic deformation of the washer that would render uncertain the reliability of the seal of the pressure sensor to the fuel rail. Integrating the washer into the pressure sensor port, such that the washer stays fixed during transportation of the pressure sensor, avoids potential disruption of the sensor port that might occur if the washer were required to be added just prior to connecting the pressure sensor to the fuel rail.

In one embodiment, an assembly process is provided, wherein a non-circular (e.g., oval, square, etc.) washer and a workpiece configured with an annular recess (e.g., a pocket or groove, etc.) having an inner diameter less than a maximum radial dimension of the washer are received. The washer is elastically deformed while being driven into the annular recess, such that the washer takes on a round shape with a diameter that is equal to or less than the inner diameter of the annular recess. Once the elastically deformed washer is pressed into the annular recess, the washer is released. Upon release, the washer will attempt to expand back into its original shape, but will be fixated against the inner wall of the annular recess by a retention force resulting from washer expansion and contact with the recess wall.

In one embodiment, the fixated expanded washer comprises an element in a sealing structure, where the height of the fixated washer is greater than a height of the annular recess inner wall. The washer may be composed of a malleable metal material that is softer than the pressure sensor annular recess inner wall. The washer may be elastically deformed by being pressed toward the annular recess through a (frusto-)conically shaped surface of an insertion tool positioned near the annular recess of the pressure sensor port. The insertion tool has a first end defining a diameter that is smaller than the diameter of the pressure sensor's annular recess, and a second end wide enough to accommodate the un-deformed washer's maximum radial dimension.

In another embodiment, the elastically deformed washer may be released while being further driven into the annular recess while the washer interacts with a chamfered region of the insertion tool extending from the first end of the conically shaped surface of the insertion tool. Mechanical interaction with the chamfer permits the released washer to slowly expand radially out to the annular recess inner wall. Through the disclosed fixating processes, the washer may be elastically deformed in the radial direction only, e.g., with no or inconsequential plastic deformation.

The deforming and driving of the elastically deformable, non-circular washer may be accomplished by pressing the washer and workpiece together with a force of less than 150N, and perhaps less than 100N, depending upon the materials and dimensions required for an application. The washer is preferably comprised of a material softer than the workpiece/pressure sensor and the fuel rail to be joined thereto. The insertion tool is also preferably formed of a material having a hardness greater than the washer, in order to reduce or avoid wear of the insertion tool.

In another aspect, a workpiece assembly system is provided for fixating the metal washer to a workpiece (e.g., pressure sensor) in order to form an integrated reliable, high pressure sealing structure. The assembly system may be configured with a mechanical press configured to push the workpiece and a lower press member (i.e., a plunger) together. The plunger has an end adapted to accommodate the non-circular elastically deformable washer. The assembly system also includes an insertion tool adaptable to the workpiece that has a port with an annular recess of a diameter less than the maximum radial dimension of the washer. A frustoconical surface of the insertion tool is positioned at a first open end positioned (when manufacturing is occurring) near the sensor port annular recess. The first open end has a diameter less than or equal to the recess inner wall diameter, but wide enough to accommodate a reciprocating tip of the plunger press member. The frustoconical surface has a second open end coaxially aligned with the first open end and dimensioned wide enough to accommodate the non-deformed maximum radial dimension of the non-circular (e.g., oval, square, etc.) washer. While pressing the washer through the insertion tool into the sensor port annular recess, the washer is elastically deformed to a round shape via radial compression by the frustoconical surface of the tool.

The insertion tool may be configured with a chamfer or a step extending from the first open end of the frustoconical surface, which permits the elastically deformed washer to expand, once it has been released by fully traversing the first open end, to mate with the inner wall of the recess of the pressure sensor. The chamfer may be configured with an angle that permits gradual expansion of the elastically deformed washer, while the step may be configured to cause a more instantaneous expansion.

In some embodiments, the tip of the plunger press member includes an annular notch for receiving the non-circular washer. The notch is dimensioned to have a width sufficient to accommodate the washer in its original non-deformed and elastically deformed shapes without imparting a retention force on the washer in either washer shape.

In alternative embodiments, the insertion tool may have an internal surface for deforming the washer that has a non-conical shape, but which radially, elastically deforms the washer from an original shape to a shape fitting into the workpiece recess. A non-annular (e.g., triangular, or four-sided shape) fixation of the washer into the workpiece recess may provide even greater retention force, i.e., wherein the washer expands partially into axial grooves in the recess inner wall.

An advantage of the disclosed embodiments is that they provide an improved, integrated sealable connector requiring few parts with effective, reliable sealing at high pressures. The washer may be composed of stainless steel, e.g., type AISI 304 stainless steel. The workpiece may comprise a fuel pressure sensor to be sealed against a fuel rail operating at high pressures (e.g., around 2700 bar).

It is to be understood that the summary, drawings, and detailed description are not restrictive of the scope of the inventive concepts described herein.

BRIEF DESCRIPTION OF THE FIGURES

The foregoing and other objects, features and advantages will be apparent from the following, more particular description of the embodiments, as illustrated in the accompanying figures, wherein like reference characters generally refer to identical or structurally and/or functionally similar parts throughout the different views. The figures are not necessarily to scale, emphasis instead being placed upon illustrating the principles of the embodiments, wherein.

DETAILED DESCRIPTION

Figure 1A:
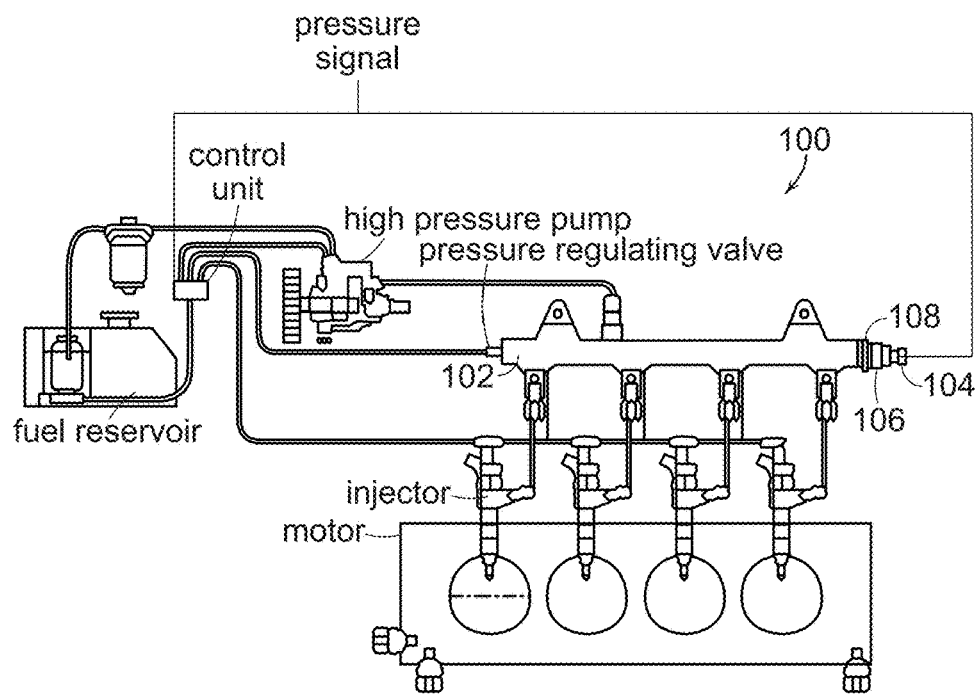
FIG. 1A is an illustration of an exemplary application environment (high pressure fuel rail sensing)

The following detailed descriptions of embodiments of integrated washer fixation methods, tools and systems are merely exemplary in nature, and in no way intended to limit the scope, equivalents, applications or principles of the disclosed embodiments. Alternatives to the embodiments may be devised without departing from the scope of the disclosure. Well-known elements of technologies associated with the embodiments will not be described in detail, or will be omitted, so as not to obscure the relevant details of the novel methods and apparatus. For example, a significant discussion of the types of machine presses that might be employed is not included, as such systems are known to those of skill in the art.

The word "exemplary" is used herein to mean "serving as an example, instance, or illustration." Any embodiment described herein as "exemplary" is not necessarily to be construed as preferred or advantageous over other embodiments. Likewise, the term "embodiment" and the descriptive language associated with each use of the term do not require that all embodiments include the discussed feature, limitation, advantage or mode of operation. As used herein, the singular forms "a", "an" and "the" are intended to include the plural forms as well, unless the context clearly indicates otherwise. It will be further understood that the terms "comprises", "comprising", "having", "configured", "includes" and/or "including", when used herein, specify the presence of stated features, steps, operations, elements, and/or components, but do not preclude the presence or addition of one or more other features, steps, operations, elements, components, and/or groups thereof. Further, the phrase "based on" is intended to mean "based, at least in part, on" unless explicitly stated otherwise. In addition, the terms "conical" and "frustoconical" may be used interchangeably in the descriptions below to mean in the shape of a frustum of a cone, including two open coaxially aligned opposed ends of different diameter, with a sloping surface there between.

As described above, and with reference to FIG. 2, disclosed embodiments relate to sealing structure assembly methods and equipment, used to integrally fixate an elastically deformable washer 200 into a pocket or recess 202 of a port 204 of a workpiece (e.g., pressure sensor 206). In the final assembled state, the washer 200 is retained by a retention force provided by an inner recess wall 208 of the port 204 in mechanical contact with an exterior side wall 210 of the washer 200.

Figure 1B:
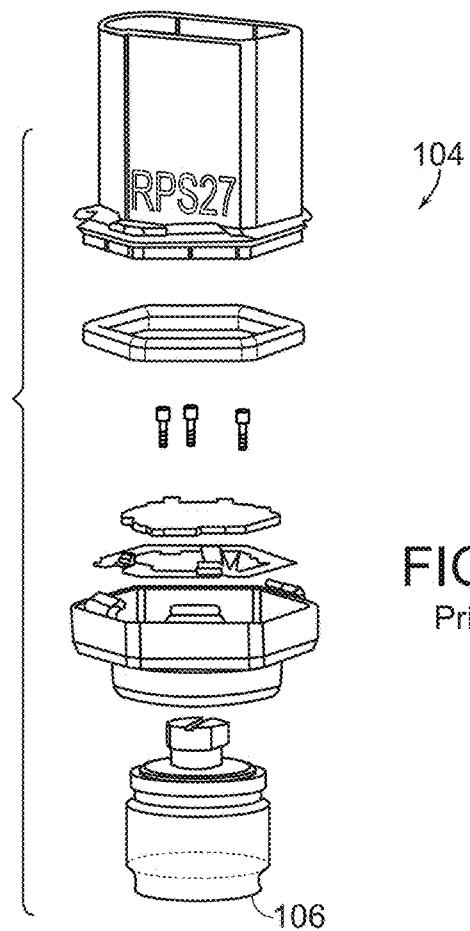
FIG. 1B is an exploded view of an exemplary pressure sensor, with which disclosed embodiments may be useful.

The disclosed assembly methods and tools were conceived for applications within the field of sensing high pressure liquids, such as fuel, in applications requiring reliable, pressure resistant sealing between the pressure sensor 206 and a fuel rail such as fuel rail 102 in FIG. 1 or any other (e.g., threadably) mateable elements. However, other applications or technology fields of endeavor may be possible, such as high vacuum applications. As noted, increasing hardness requirements for fuel rails has rendered conventional sealing techniques unreliable. For example, in conventional systems, sensor port material was harder than fuel rail material, and a "sealing nose" (biting edge) was pressed into the fuel rail to create a leak tight seal. Thus a sealing concept that is independent of fuel rail hardness has been developed, wherein a metal layer (elastically deformable washer 200) of a weaker material is fixated integrally within port recess 202 of pressure sensor 206 (e.g., a LFF4 M18 2700 bar fuel Pressure Sensor) with a machine press insertion force of <100N. An exposed portion 212 of washer 200 in its assembled fixated position will be between the sensor port 204 and a fuel rail 102, thereby forming a reliable high pressure sealing structure. Advantageously, the washer 200 stays in the port recess 202 while sensor 206 is being transported. This is important, as transportation of automotive parts from suppliers to customer auto manufacturers is quite common, and mounting at the customer's facility is typically a blind operation that may be automated. After transportation, the washer 200 is squeezed between the fuel rail 102 and the sensor port 204 during their joining, in a cleaner operation with no risk that the wrong number of washers (i.e., none or too many) or the wrong type of washer is installed in an assembly.

Figure 2:
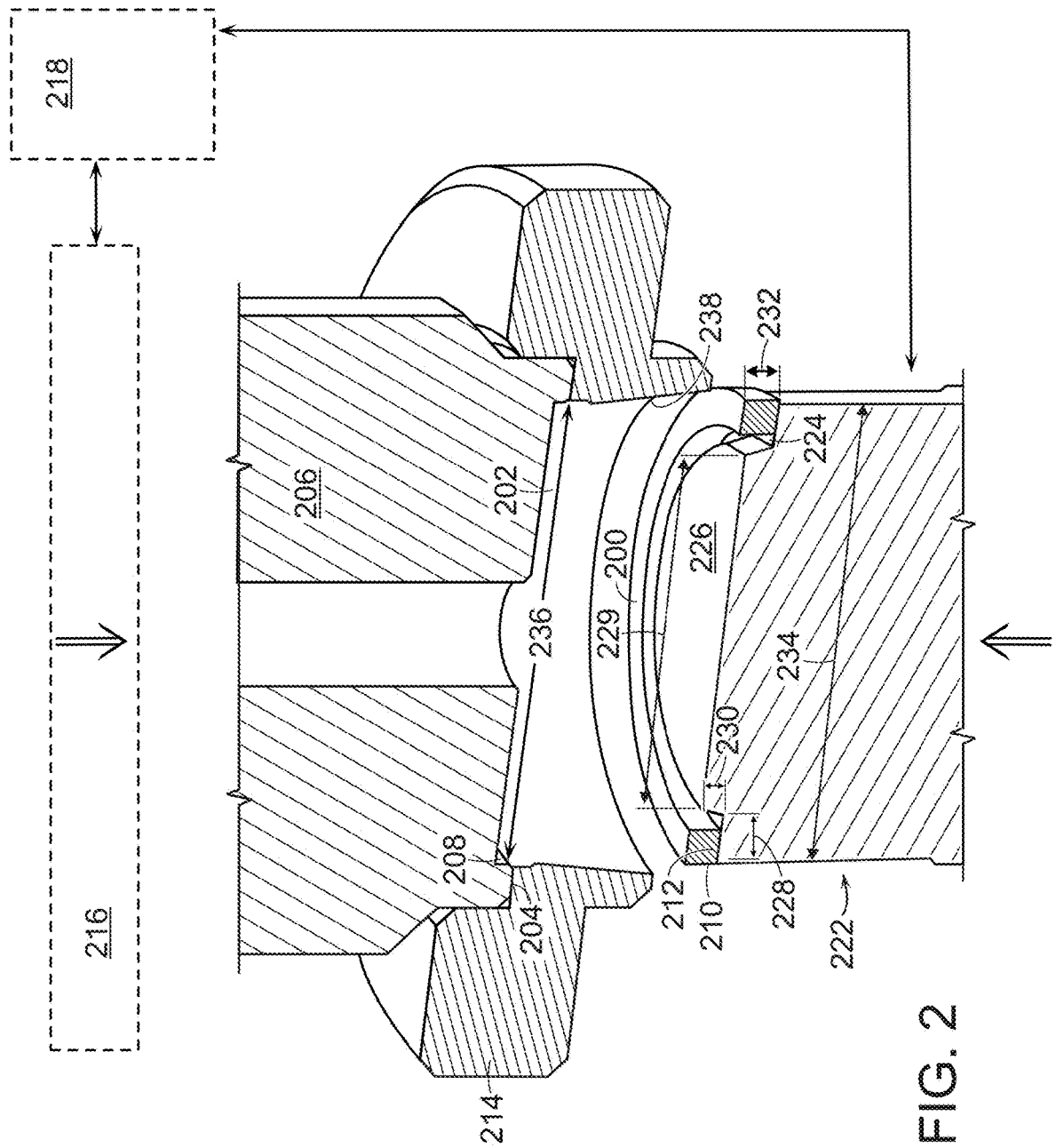
FIG. 2 is an illustration of an initial configuration of an assembly system in accordance with an embodiment.

An assembly method that elastically stresses the washer 200 radially to secure it to the pressure sensor port 204 in a manner that is not destructive for either component will be better understood with reference to FIGS. 2 to 6 showing example manufacturing steps for such assemblies. With reference to FIG. 2, a first step in an exemplary method may comprise concentrically mounting a frustoconical insertion tool 214 about the port 204 end of the sensor 206, and mounting the other end of the sensor 206 in the upper press member 216 of a machine press 218 of a type known to those of skilled in the art. In another embodiment, the upper press member 216 of machine press 218 may be downwardly moved, pushing sensor port 204 against spring forces supporting an insertion tool 214 to stably position and apply joining forces between the port 204 and the insertion tool 214 and washer 200. Coaxially aligned below the mounted pressure sensor 206 and insertion tool 214 is a lower press member (e.g., plunger 222) comprised of a solid metal shaft reciprocally moveable in a vertical direction and controlled by the machine press 218. The elastically deformable, non-circular washer 200 is initially placed in a notch 224 in the tip 226 of plunger 222.

The plunger notch 224 has a width 228 wide enough to accommodate the washer 200 in its initial noncircular, non-deformed shape and an annular diameter 229 smaller than the smallest radial dimension of the washer 200 in its radially deformed round shape (shown later.) The notch has a height 230 is less than the height 232 of the washer 200, which will likely not change because the washer 200 will not be subjected to axial compression forces sufficient to axially deform the washer 200. Washer 200 has a non-circular maximum radial dimension 234 that, in its non-deformed state, is greater than the diameter 236 of annular recess 202 in the port 204 of pressure sensor 206. The insertion tool 214 is configured with a frustoconical inner surface 238 sloping inward (toward a central axis of the tool) with a tapered draft angle 240 from a first open end 242 disposed proximate the port recess 202 to a second open end 244 for accommodating the plunger 222 and the maximum radial dimension 234 of the non-deformed washer 200. The plunger 222 has an outer diameter 223 that is less than the annular recess diameter 236 and the diameter 246 of the first open end 242. The first open end 242 has a diameter 246 slightly smaller than the annular recess diameter 236 but wide enough to accommodate the plunger 222 and the washer 200 in its elastically radially deformed shape (e.g., round). The draft angle 240 is selected to make gradual the application of radial compression forces by the conical surface 238 to the external wall 210 of washer 200.

Figure 3:
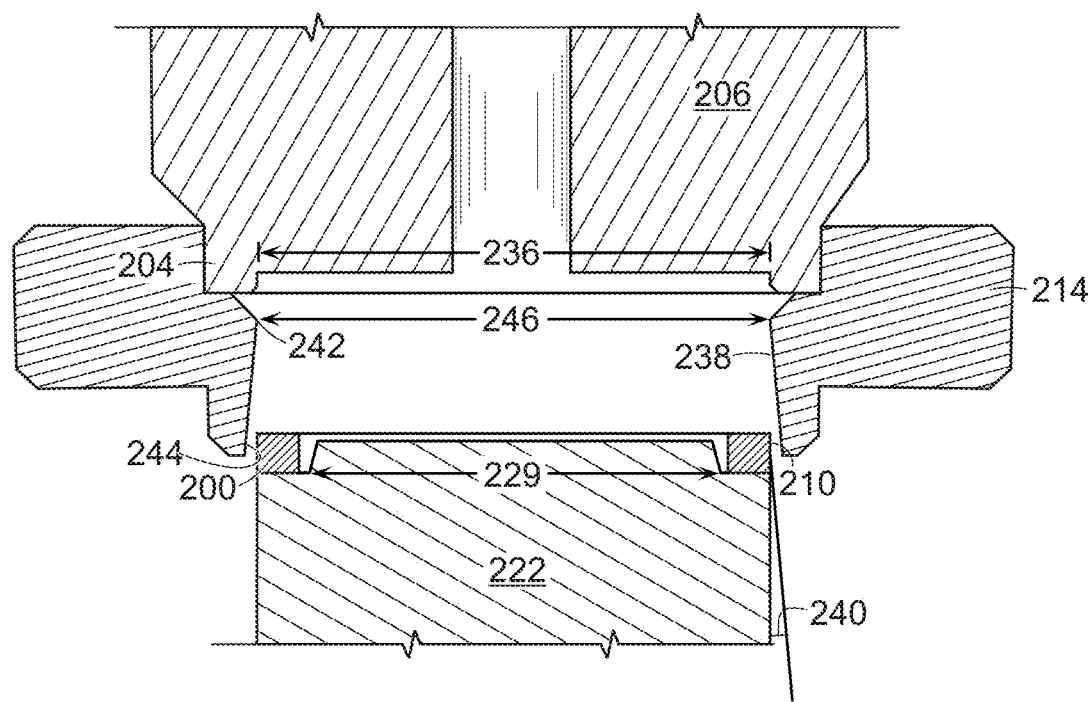
FIG. 3 is an illustration of an exemplary embodiment of an assembly system in an initial elastic deformation state.
Figure 4A:
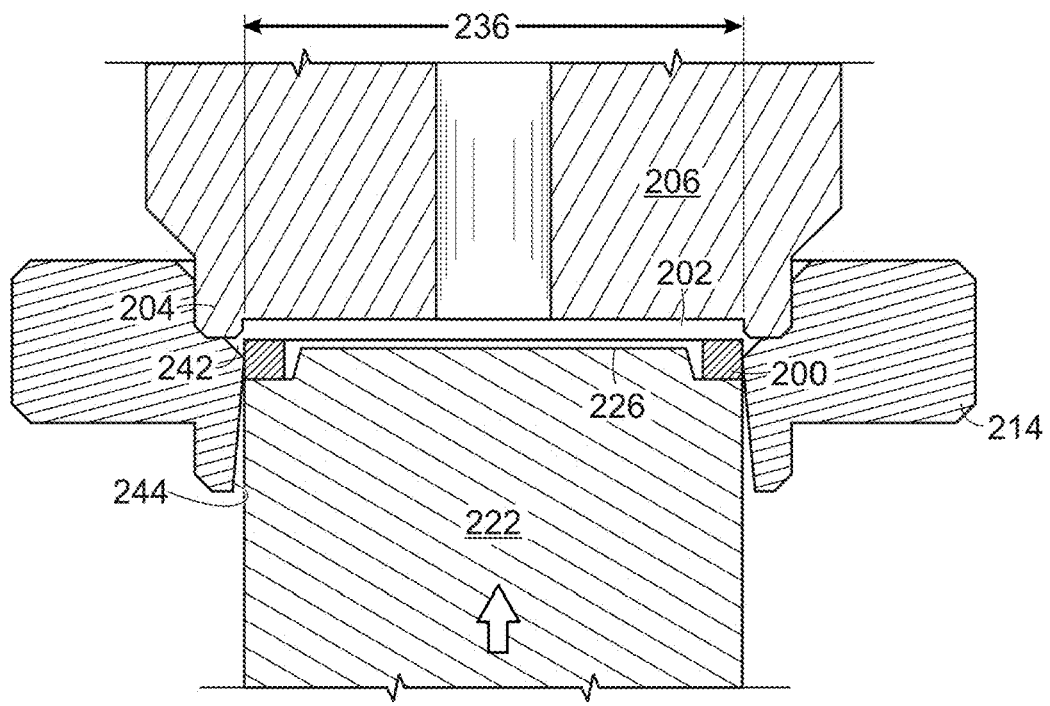
FIGS. 4A and 4B are illustrations of an exemplary embodiment of an assembly system in further elastic deformation states.
Figure 4B:
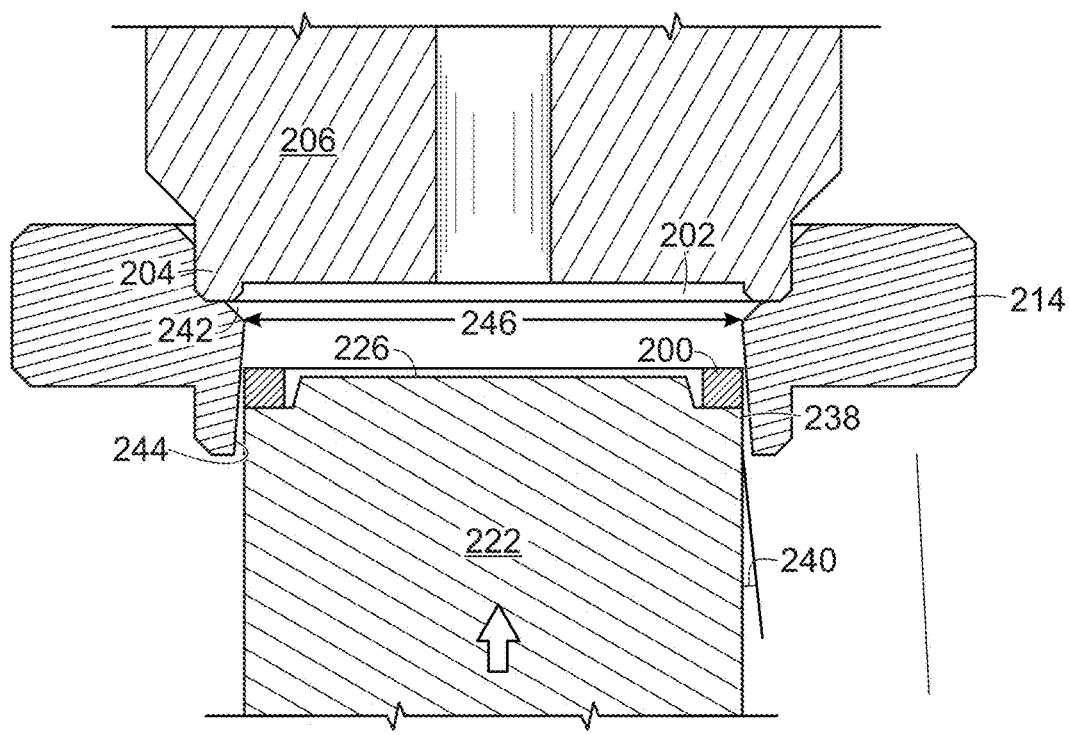

As shown in FIG. 3, as the plunger 222 vertically presses the washer 200 and the sensor port 204 together (using a force typically less than 100N but up to 150N), the frustoconical inner surface 238 of insertion tool 214 contacts washer 200 and exerts an elastically deforming force on the exterior side wall 210 (and corner) of the washer 200, radially compressing the washer 200 to a round shape. As shown in FIGS. 4A and 4B, washer 200 is increasingly radially compressed in response to the draft angle 240 of the conical inner surface 238 as plunger 222 further presses washer 200 through the insertion tool 214. Washer 200 is subject to the greatest deformation at the first open end 242, which is the deepest-extending point of the frustoconical inner surface 238. Due to the diameter 246 of the first open end 242 of the conical inner surface 238 being smaller than the annular recess diameter 236 and the first open end's proximate positioning relative thereto, when deformed washer 200 is pressed through and released by the first open end 242 in a round shape, the washer 200 is received by the annular port recess 202 with or without contact with the recess inner wall 208. Tight tolerances and slight misalignments may make contact unavoidable, but low retention forces are initially present between the washer 200 and recess inner wall 208 until the washer 200 is released from insertion tool 214. FIG. 4A shows the deformed washer 200 as it partially enters the port recess 202.

Figure 5:
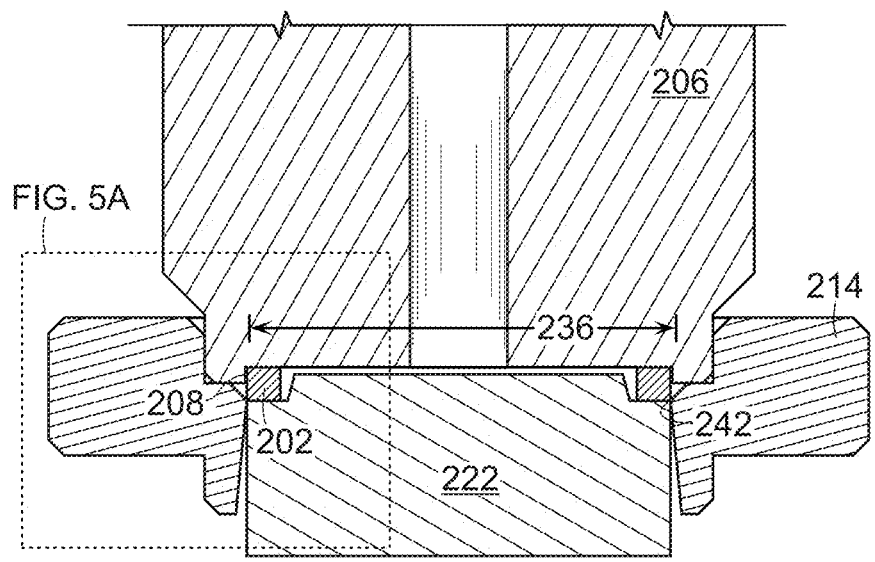
FIG. 5 is an illustration of an exemplary embodiment of an assembly system showing a chamfered release of the deformed washer, FIG 5A being a close up view of a section of FIG. 5.
Figure 5A:
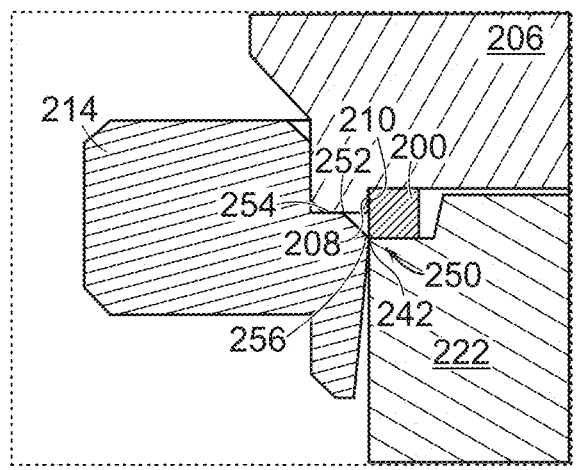

With reference to FIGS. 5 and 5A, once the elastically deformed washer 200 is driven by plunger 222 completely through the insertion tool first open end 242, the radial compression force that had been provided by the open end 242 to the washer 200 is removed, releasing the washer 200. Radial expansion forces will then attempt to radially expand back washer 200 to its non-deformed shape (e.g., oval, etc.). If washer 200 is not already in contact with the recess inner wall 208, washer 200 may slightly expand into contact with the recess inner wall 208. If washer 200 is already contacting recess inner wall 208 upon release from the insertion tool 214, the radial expansion forces are immediately opposed by retention forces from the recess inner wall 208. Where washer side wall 210 contacts the recess inner wall 208, the expansion of washer 200 will be halted and washer 200 will become integrally fixated due to the retention force provided by the recess inner wall 208 limiting washer expansion to the recess diameter 236 which is smaller than the maximum radial dimension 234 of the washer 200 in its original, non-deformed shape. In one example, a 31N retention force achievable for a 300 mg steel washer in contact with a steel recess wall providing a friction coefficient β of 0.4 and 0.8 will equate to a theoretical acceleration required to remove the washer from the recess of approximately a=Fμ/m= (31N*0.4)/0.0003 kg=4133G.

The annular shape of the recess inner wall 208 may or may not allow the washer 200 to regain or maintain a little of its original oval shape, expanding from its elastically deformed shape by, for example, perhaps up to a few tens of millimeters. A radial force is exerted on the portion of the exterior wall of washer 200 contacting the recess inner wall 208. In one alternative embodiment, the inner wall 208 of the recess 202 is not necessarily a substantially smooth cylinder. Rather, discontinuities (e.g., one or more grooves, etc.) in an otherwise smooth continuous surface of the inner wall 208, or a non-annular shape to the entire recess 202, may permit the washer 200 to expand slightly more into such discontinuities in order to further fixate the washer 200 against rotation within the port 204.

The expansion of the released washer 200 may occur quickly, snapping outward to the recess inner wall 208 immediately after the washer 200 is released from the insertion tool first open end 242. The insertion tool may be configured with a stepped chamfer that permits washer 200 to quickly expand to a maximum shaped determined by the recess inner wall 208 dimensions. Alternatively, washer expansion may be designed to occur gradually, by configuring the frustoconical insertion tool 214 with a chamfer 250 that begins at the first open end 242 and radially expands down to a surface 252 of the insertion tool 214 that abuts a facing surface 254 of the sensor port 204. The chamfer 250 has an angled surface 256 that interacts with the external wall 210 of the released washer 200, permitting the released washer 200 to gradually radially expand as the released washer 200 is further pressed by plunger 222 into port recess 202. Expansion of the released washer 200 along the insertion tool chamfer 250 will halt when the released washer's outer wall 210 encounters the recess inner wall 208.

Figure 6:
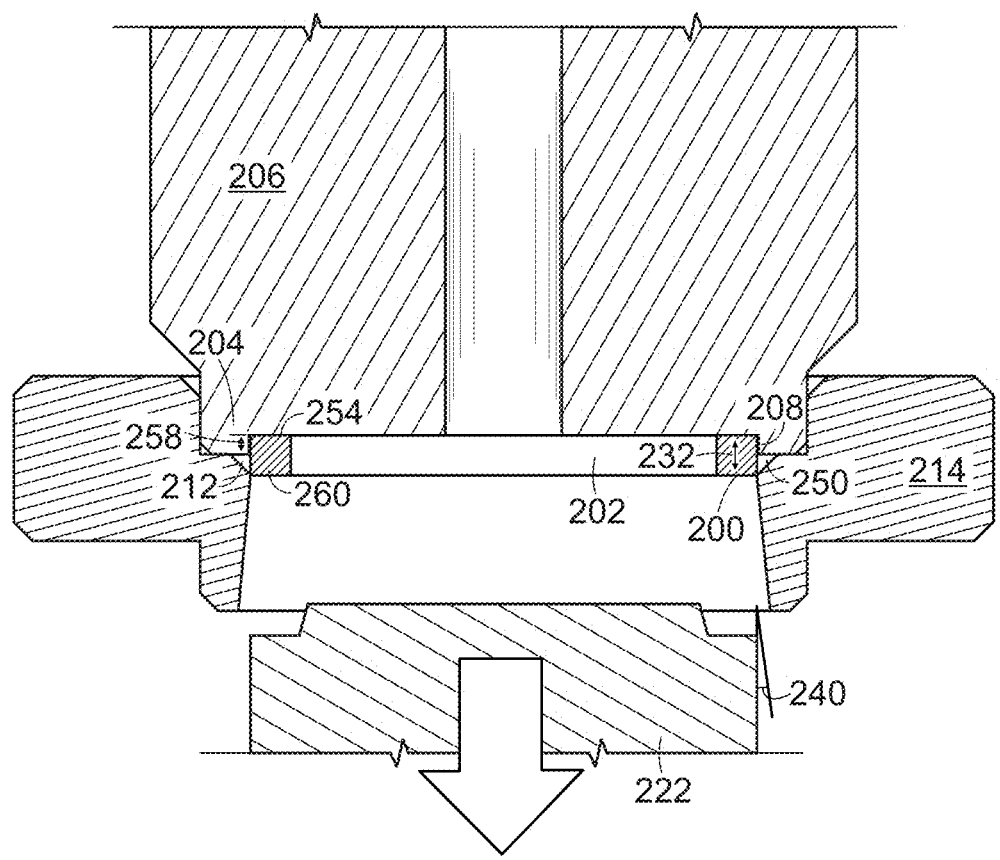
FIG. 6 an illustration of an exemplary embodiment of an assembly system showing a washer in a retained position within a workpiece recess.

FIG. 6 shows the plunger 222 being retracted after released washer 200 is fully inserted into and centered within the port recess 202, where it is integrally fixated by the retention force. The insertion tool 214 may also be removed at this point. The exposed washer region 212 protruding from the port recess 202 has a height 232 greater than a height 258 of the port recess inner wall 208, such that when the sensor assembly is joined to the fuel rail 102 (e.g., by threadable mating), the protruding washer region 212 forms a deformable sealing element within a sealing structure between the pressure sensor 206 and fuel rail 102. It is not essential that the fixated washer 200 exactly conform to the shape of recess inner wall 208, only that there is a port recess surface 254 against which a bottom wall 260 of the fixated washer 200 may form the sealing structure when the sensor 206 is connected to the fuel rail 102.

Advantageously, only radial elastic deformation is exhibited by the washer 200. The forces designed to deform the washer 200 as desired are a function of hardness and mechanical profile parameters for the washer 200, the frustoconical insertion tool 214 (including drafting angle 240 and chamfer 250), sensor port recess 202 and plunger 222. The washer 200 material and hardness may vary, depending on the design pressures, the dimensions, the application of the sealing structure, but is formed of a material softer than the fuel rail 102, pressure sensor 206 and insertion tool 214. For example, the washer 200 may be comprised of stainless steel or alloy steel and have a hardness of less than 200 HV Rockwell (B-scale), while the fuel rail 102 and port has a hardness range has a hardness on the order of about 314 HV and the port has a hardness in the range of 350 HV. It has been observed that components of these hardness ranges can achieve suitable elastic deformation with pressing forces of less than 100N. The washer may be formed by metal forming processes (e.g., fine blanking) that minimize rough edges.

Those of skill in the art will readily appreciate that numerous variations in the disclosed embodiments may be made without deviating from the inventive concepts disclosed. For example, in one embodiment, non-circular washer 200 may have a triangular, square or other shape, and be compressed to be received by a corresponding triangular, square or other shaped port recess. In another embodiment, insertion tool 214 may be comprised of multiple compression elements that cooperate to radially compress the washer.

Whereas many alterations and modifications of the disclosure will no doubt become apparent to a person of ordinary skill in the art after having read the foregoing description, it is to be understood that the particular embodiments shown and described by way of illustration are in no way intended to be considered limiting. No element, act, or instruction used herein should be construed as critical or essential unless explicitly described as such.

What is claimed is:

1. An assembly system, comprising:
   a washer having a maximum radial dimension;
   a workpiece including a recess of a diameter less than the maximum radial dimension of the washer;
   a plunger having an end adapted to accommodate the washer;
   an insertion tool configurable to the workpiece, such that a first end of a conical surface of the insertion tool is positioned proximate the recess, the first end defining a diameter less than or equal to the recess diameter but wide enough to accommodate the end of the plunger, the conical surface having a second end wide enough to accommodate the maximum radial dimension of the washer;
   whereby pressing the washer through the insertion tool into the recess elastically deforms the washer via radial compression of the washer by the conical surface of the tool.

2. The assembly system of claim 1, wherein:
   the insertion tool is further configured with a chamfer extending from the first end of the conical surface and away from the second end, the chamfer permitting the elastically deformed washer to expand to mate with an inner wall of the recess.

3. The assembly system of claim 2, wherein the chamfer is configured with an angle to permit gradual expansion of the elastically deformed washer.

4. The assembly system of claim 2, wherein the chamfer is configured with a stepped feature to permit quick expansion of the elastically deformed washer.

5. The assembly system of claim 1, wherein the end of the plunger comprises a notch for receiving the washer having a notch width small enough to accommodate radial elastic deformation of the washer.

6. The assembly system of claim 1, further comprising a press for pushing the workpiece and the plunger together.

7. The assembly system of claim 1, the plunger and insertion tool having a hardness greater than the respective hardnesses of the workpiece and the washer.

8. The assembly system of claim 1, wherein the workpiece comprises a pressure sensor.

* * * * *